United States Patent
Schuster et al.

(10) Patent No.: US 12,384,726 B2
(45) Date of Patent: Aug. 12, 2025

(54) CERAMIC MATRIX COMPOSITE COMPONENT AND METHOD OF FORMING

(71) Applicant: GENERAL ELECTRIC COMPANY, Schenectady, NY (US)

(72) Inventors: Michael Schuster, Scotia, NY (US); Daniel Gene Dunn, Guilderland, NY (US)

(73) Assignee: General Electric Company, Evendale, OH (US)

( * ) Notice: Subject to any disclaimer, the term of this patent is extended or adjusted under 35 U.S.C. 154(b) by 102 days.

(21) Appl. No.: 18/174,808

(22) Filed: Feb. 27, 2023

(65) Prior Publication Data
US 2024/0286964 A1 Aug. 29, 2024

(51) Int. Cl.
*C04B 35/80* (2006.01)
*B32B 18/00* (2006.01)
*C04B 35/628* (2006.01)

(52) U.S. Cl.
CPC .............. *C04B 35/80* (2013.01); *B32B 18/00* (2013.01); *C04B 35/62884* (2013.01); *B32B 2260/023* (2013.01); *B32B 2260/04* (2013.01); *C04B 2235/5256* (2013.01); *C04B 2235/614* (2013.01)

(58) Field of Classification Search
CPC .............. C04B 35/80; C04B 35/62844; C04B 35/62884; C04B 2235/5256; C04B 2235/5268; C04B 2235/614; C04B 2235/616; B32B 18/00; B32B 2260/04
USPC .................. 428/297.4; 501/88, 90, 96.3, 97.4
See application file for complete search history.

(56) References Cited

U.S. PATENT DOCUMENTS

| | | | |
|---|---|---|---|
| 9,221,218 B2 | 12/2015 | Roberts, III et al. | |
| 9,815,736 B2 | 11/2017 | Dunn et al. | |
| 10,370,292 B2 | 8/2019 | Dunn et al. | |
| 10,941,491 B2 | 3/2021 | She et al. | |
| 11,404,175 B2 | 8/2022 | Lahoda | |
| 2010/0279845 A1* | 11/2010 | Kebbede | C04B 35/62871 501/97.4 |
| 2018/0194686 A1 | 7/2018 | Loison et al. | |
| 2019/0108922 A1 | 4/2019 | Lahoda | |
| 2021/0164104 A1 | 6/2021 | She et al. | |

* cited by examiner

*Primary Examiner* — Camie S Thompson
(74) *Attorney, Agent, or Firm* — Dority & Manning, P.A.

(57) ABSTRACT

A ceramic matrix composite (CMC) component and method of forming the CMC component with multiple layers of impregnated matrix fibers, at least one of the multiple layers including at least one CMC prepreg formed from a plurality of twisted tows, twisted through at least one turn/meter.

20 Claims, 9 Drawing Sheets

CERAMIC MATRIX COMPOSITE COMPONENT AND METHOD OF FORMING

TECHNICAL FIELD

The present disclosure generally relates to a component, more specifically, to a method of forming a ceramic matrix composite component.

BACKGROUND

Composite materials typically include a fiber-reinforced matrix and exhibit a high strength to weight ratio. Due to the high strength to weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine. Extreme loading and high temperatures can be applied to the composite components of the aircraft or turbine engine. For example, extreme loading can occur to one or more airfoils during ingestion of various materials by the turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Aspects of the disclosure herein are directed to a ceramic matrix composite (CMC) component and a method for forming the CMC component. It was found that intentionally twisting tows produces more bridging fibers in plies forming the CMC component. Additional bridging fibers increase the intralaminar toughness in each of the multiple plies forming the CMC component. Intentionally twisting the tows also improves the handling characteristics and manufacturability of the CMC component.

Figure 6:
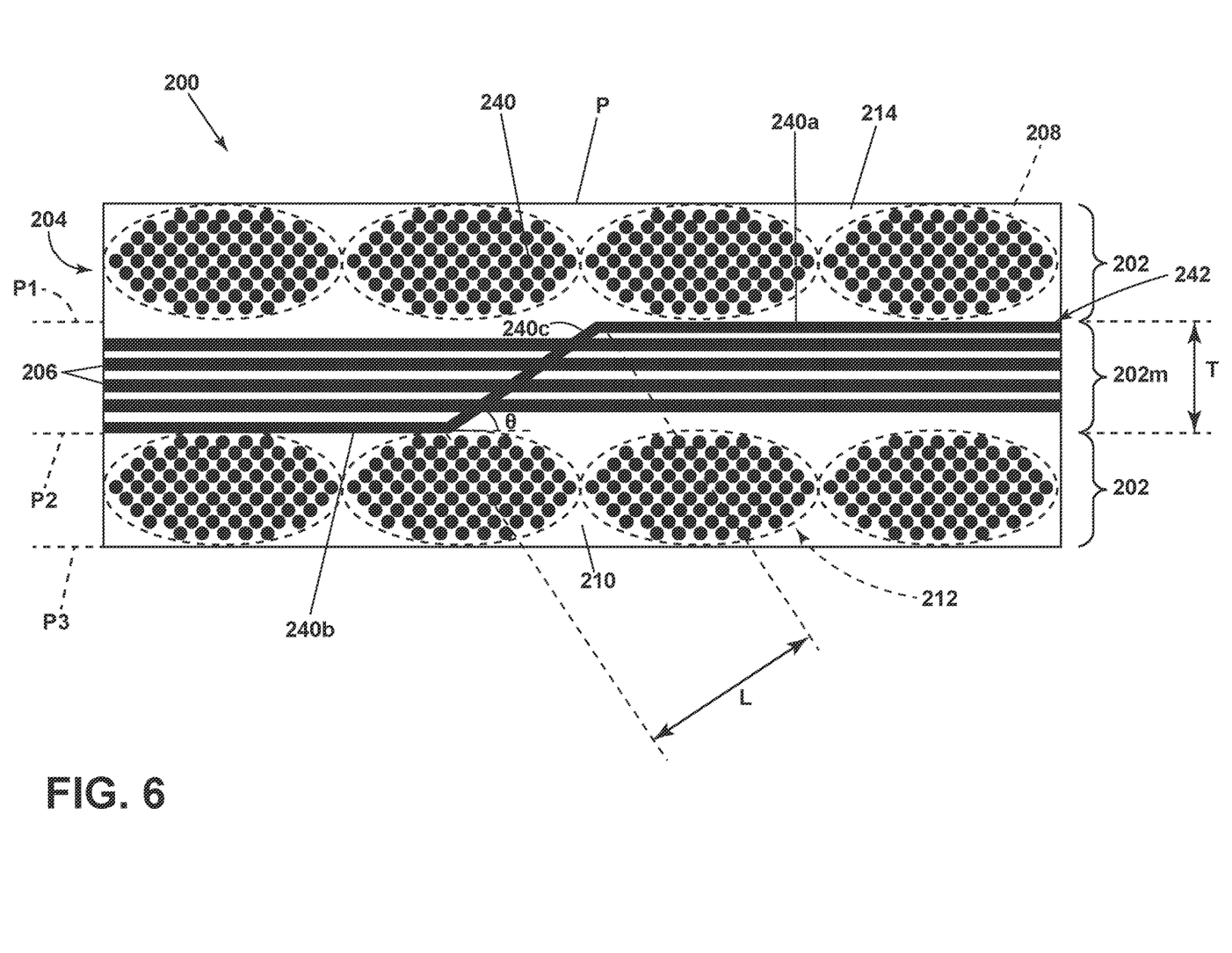
FIG. 6 is a schematic cross-sectional view of a component according to an aspect of the disclosure herein.

Current prepreg ceramic matrix composite structures do not have any bridging fibers intentionally reinforcing the through thickness, denoted herein as "T." A measured resistance to shear forces is much higher with a certain number of misaligned fibers than that of an unreinforced matrix material. This improvement in intralaminar toughness is due to fibers that are slightly misaligned relative to an in-plane direction (FIG. 6). These misaligned fibers can bridge intralaminar layers at shallow angles and provide a degree of toughness. This disclosure herein provides a way to intentionally misalign fibers to achieve more robust shallow angle bridging and enable higher intralaminar toughness. The methods and components described herein include fibers that are misaligned by twisting a tow bundle prior to filament winding the tow into prepregs. The tow bundle must be twisted enough to ensure shallow angle bridging, but not so much as to prevent the tow from being impregnated during the winding process.

The term "composite," as used herein, is indicative of a component having two or more materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fiber, polymeric resin, thermoplastic, bismaleimide (BMI), polyimide materials, epoxy resin, glass fiber, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic components (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers can be impregnated with a slurry composition prior to forming the preform or after formation of the preform. The preform may then undergo thermal processing and subsequent chemical processing, such as melt-infiltration with silicon, to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

The reinforcing fibers can be at least portions of individual filaments or strands. As used herein, a "ceramic fiber tow," a "fiber tow," or simply a "tow" refers to a bundle of a plurality of individual fibers, filaments, or loose strands. The filaments of a tow may be randomly intermingled or arranged in a pattern, and/or may be continuous or non-continuous. For example, a tow may include broken filaments or filament segments. As another example, the filaments of a tow may be substantially parallel, twisted, or otherwise arranged. A tow may act substantially in the same manner as a single or individual filament. It will also be appreciated that an "individual ceramic filament," or simply an "individual filament," as used herein, refers to a singular or non-bundled elongate ceramic member.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbine blades, and vanes), combustors, shrouds and other like components, that would benefit from the lighter-weight and higher temperature capability these materials can offer.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As may be used herein, the terms "first", "second", or "third" may be used interchangeably to distinguish one component from another and are not intended to signify location or importance of the individual components.

The term "at least one of" in the context of, e.g., "at least one of A, B, and C" refers to only A, only B, only C, or any combination of A, B, and C.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. For example, in the overall context of a turbine engine, radial refers to a direction along a ray extending between a center longitudinal axis of the engine and an outer engine circumference. In addition, as used herein, the terms "circumferential" and "circumferentially" refer to directions and orientations that extend arcuately about the centerline of the gas turbine engine.

The terms "coupled," "fixed," "attached to," and the like refer to both direct coupling, fixing, or attaching, as well as indirect coupling, fixing, or attaching through one or more intermediate components or features, unless otherwise specified herein.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

As used herein "bridging fiber" refers to fibers that extend through the thickness "T" of any ply described herein. A greater bridging the fiber angle the better the chance of a particular fiber participating in bridging between layers. A bridging fiber having a fiber angle of 90 degrees would be extending directly along the thickness direction.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Figure 1:
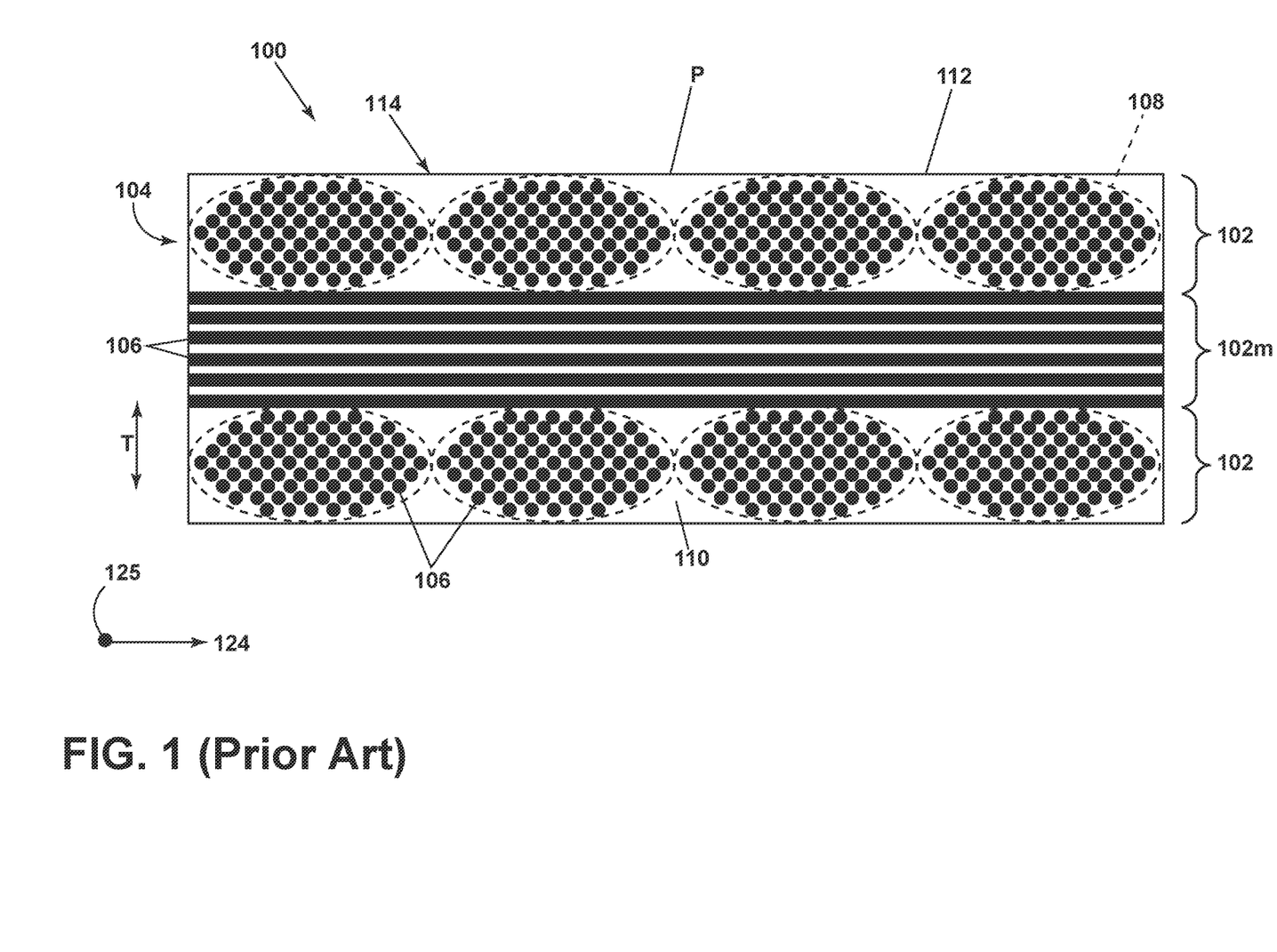
FIG. 1 is a schematic cross-sectional view of a component including multiple plies with reinforcing fibers.

Referring now to the drawings, FIG. 1 is a schematic cross-sectional view of a prior art component 100 including multiple plies 102. The component 100 can be formed of a CMC material where manufacturing the component 100 entails stacking and debulking multiple plies 102 to form a laminate, referred to herein as a laminate preform 114, by a process referred to as "lay-up." Each ply 102 contains a ceramic reinforcement made up of multiple fibers 106 bundled into individual tows 108 and encased in a ceramic matrix 110. The ceramic matrix 110 is formed by conversion, by way of non-limiting example with firing, of a matrix precursor as a binder used to impregnate the tows 108. In one non-limiting process, the matrix precursor is a matrix slurry utilized to impregnate tows 108 where a set of tows 112 can form a prepreg 104 usually in the form of a ply or sheet. When laid out, each prepreg 104 forms each ply 102. The multiple fibers 106 can be unidirectionally aligned such that a single layer of ply 102 can include the set of tows 112 aligned and impregnated with the matrix precursor and arranged unidirectionally. For example, a middle ply 102m includes fibers 106 extending along a first direction 124, across the page, and fibers 106 in the plies 102 bordering the middle ply 102m extend in a second direction 125. The first and second directions 124, 125 can be perpendicular to each other.

The prepregs 104 are typically, but not necessarily, arranged so that tows 108 of adjacent prepregs 104 are oriented transverse to each other, providing greater strength in a laminar plane (denoted "P"), extending into and out of the page, of the laminate preform 114 (corresponding to the principal (load-bearing) directions of the final CMC component). However, the prepregs may be arranged in other ways as well, e.g., tows of one or more adjacent prepregs may not be oriented transverse or perpendicular to each other but, in various embodiments, may be parallel to each other, offset from each other less than 90 degrees, etc. A stack of prepregs may include adjacent prepregs having a variety of tow orientations with respect to each other.

Figure 2:
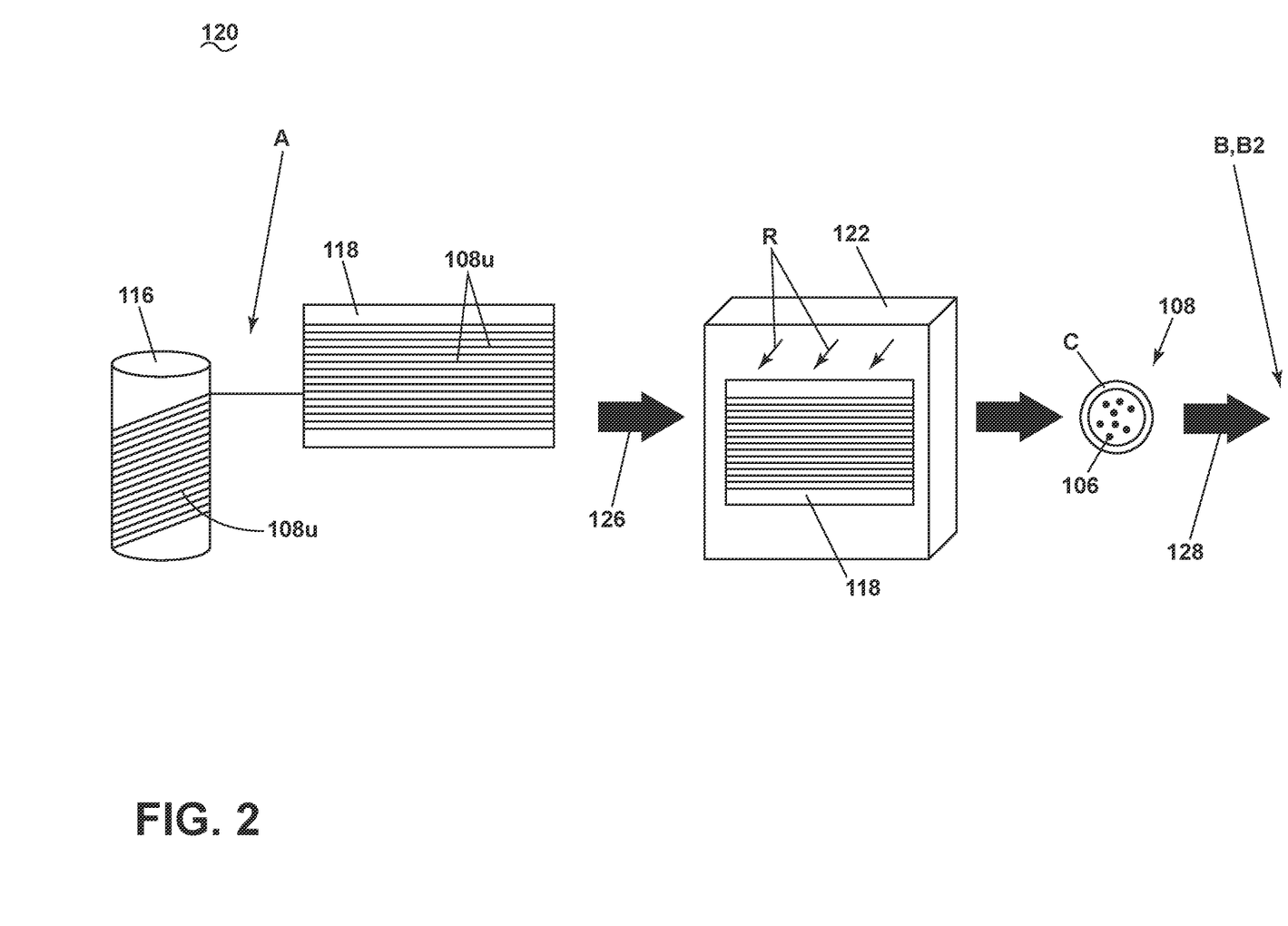
FIG. 2 is a schematic illustration of a process for coating the reinforcing fiber from FIG. 1.

Referring to FIG. 2, a process 120 for coating a reinforcing fiber is illustrated. It will be appreciated that the reinforcing fiber can be the fiber 106 or an uncoated tow 108u (a tow 108 prior to coating), and hereinafter references to "reinforcing fiber" apply to either fiber 106, uncoated tows 108u, or both. Prior to or as part of forming the prepregs 104, uncoated tows 108u are wound onto a bobbin 116, or fiber source. The uncoated tows 108u can be unwound from the bobbin 116 for coating. The multiple fibers 106, bundled together in the form of uncoated tows 108u, are coated for several purposes, such as to protect them during composite processing, to modify fiber-matrix interface strength, and/or to promote or prevent mechanical and/or chemical bonding of the fiber and matrix. A number of different techniques have been developed for applying fiber coatings, such as slurry-dipping, sol-gel, sputtering, and chemical vapor deposition (CVD). Of these, CVD has been most successful in producing impervious coatings of uniform thickness and controlled composition.

In a typical CVD process, fibers and reactants are heated to some elevated temperature where coating precursors decompose and deposit as a coating. CVD coatings can be applied either in a continuous process or a batch process. In a continuous process, fibers and coating precursors are continuously passed through a reactor.

In a batch process, a length of uncoated tow 108u is unwound from the bobbin 116 onto a frame 118. The uncoated tow 108u can be under tension as it is wound onto the frame 118. For instance, a winding tension may be maintained on the uncoated tow 108u as it is unwound from the bobbin 116 onto the frame 118. In some embodiments, the winding tension may be within a range of about 0.01% of a breaking strength of an uncoated tow 108u to about 90% of the breaking strength of the uncoated tow 108u.

Once disposed on the frame 118 and unwinding from the bobbin 116 has ceased, the tension on the uncoated tow 108u may be relaxed to a steady state tension. For instance, the frame 118 or a component thereof may be relaxed, withdrawn, etc. to change the perimeter of the frame 118, which relaxes the tension on the fibers 106 defining the uncoated tow 108u. The steady state tension on the uncoated tow 108u is lower than the winding tension and may be very low, e.g., essentially zero.

After the uncoated tow 108u is transferred to the frame 118, the frame 118 is then introduced into a reactor 122 and remains within the reactor 122 while reactants (denoted "R") are passed through the reactor 122. As previously described, a temperature within the reactor 122 may be elevated such that, as reactants R are passed through the reactor 122, coating precursors decompose and deposit as a coating (denoted "C") on the uncoated tow 108u to form tow 108. Depositing the coating can include depositing the coating via CVD as previously described herein. The tow 108, now coated with the coating C, can be impregnated as part of the set of tows 112 (FIG. 1) to form the component 100 as described herein.

It will be appreciated that FIG. 2 provides only a general, schematic depiction of an apparatus for transferring uncoated fiber from a fiber source to a frame for depositing a coating onto the fiber in a reactor. Other components, such as a drive mechanism, one or more pulleys, one or more sensors, a controller, etc., may be used with the bobbin 116, frame 118, and reactor 122 to coat the uncoated tows 108u using a batch process as described herein. It will be appreciated that the reinforcing fiber wrapped around the frame 118 may be fiber 106 or uncoated tows 108u and hereinafter references to "reinforcing fiber" apply to either fiber 106, uncoated tows 108u, or both. Further, the following description uses the singular term "tow," but it will be appreciated that the following description could apply to a single tow (e.g., a single uncoated tow 108u wound on the frame 118 that is coated and unwound from the frame 118 as a single coated tow 108) or to multiple tows (e.g., multiple lengths of uncoated tows 108u are wound onto the frame 118, coated, and unwound from the frame 118 as multiple lengths of coated tows 108).

Figure 3:
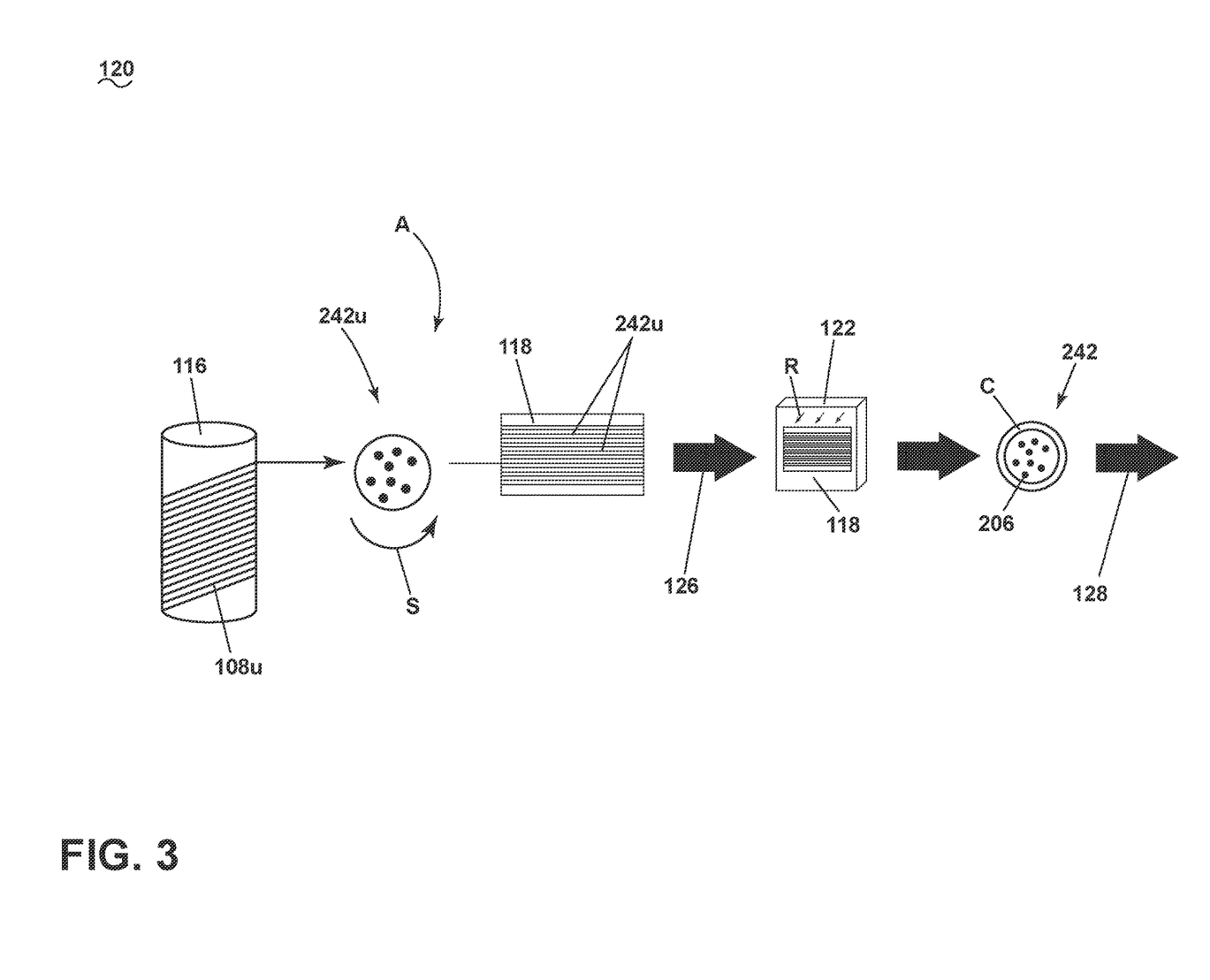
FIG. 3 is a schematic illustration of an optional second step for the process from FIG. 2.

FIG. 3 illustrates a first optional step (denoted "A" in FIG. 2) for forming a twisted tow 242 from the process 120 described herein. The uncoated tows 108u are twisted to form an uncoated twisted tow 242u prior to being wound on the frame 118. The process 120 can continue as described herein from corresponding arrow 126 illustrated in FIG. 2 and FIG. 3 to form a coated twisted tow, or simply referred to herein as the twisted tow 242. Prior to impregnation, the twisted tow 242 can undergo a left-hand twist, or reverse twist, also known as an "S" twist (denoted "S").

Figure 4:
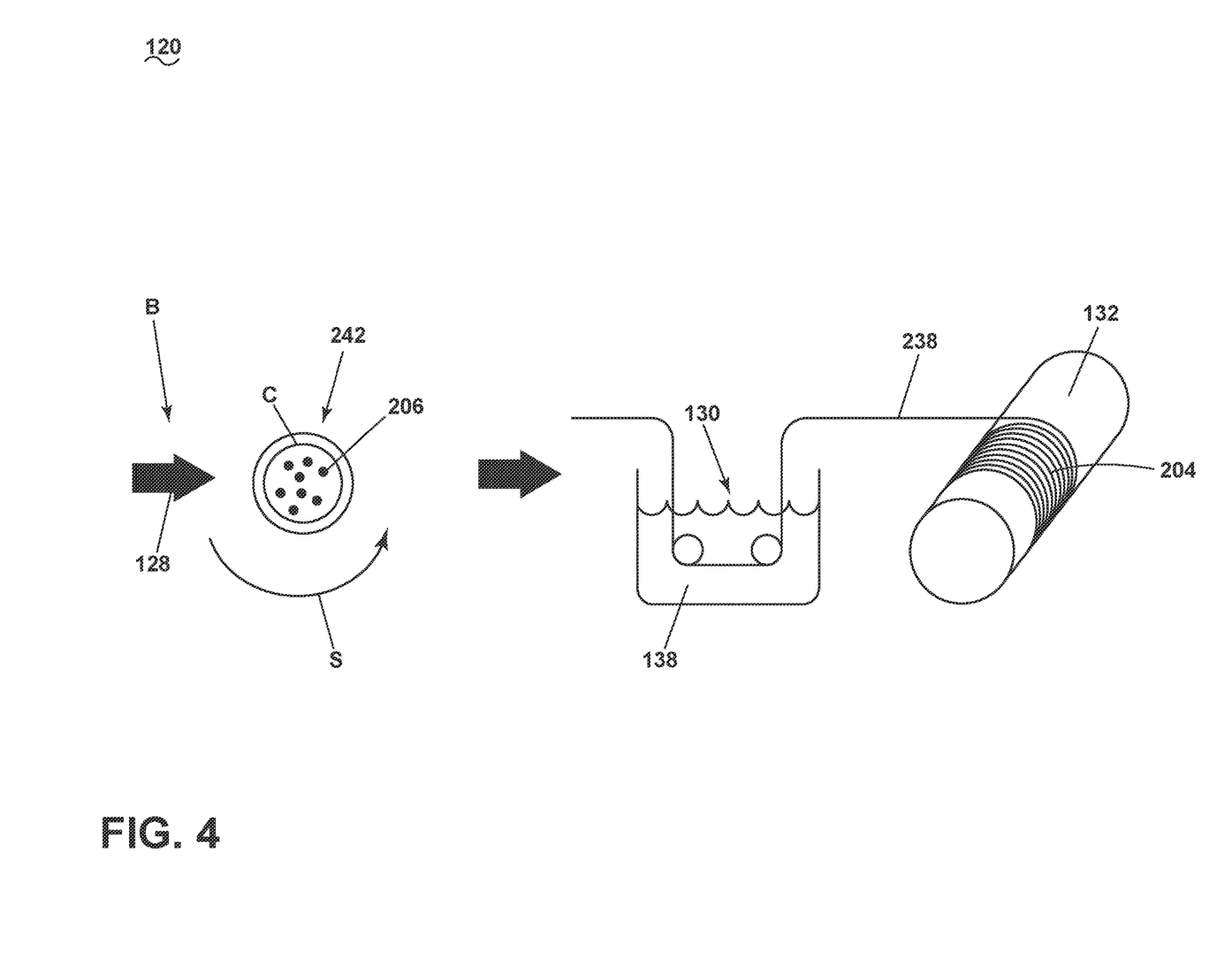
FIG. 4 is a schematic illustration of an optional third step for the process from FIG. 2.

FIG. 4 illustrates a second optional step (denoted "B" in FIG. 2) for forming the twisted tow 242 from the process 120 described herein. The process 120 can continue from corresponding arrow 128 illustrated in FIG. 2 and FIG. 4. The tow 108 is twisted with an S twist to form the twisted tow 242. The twisted tow 242 is then impregnated with a matrix slurry 130 having a ceramic matrix precursor 138 to form an impregnated set of tows 238. The impregnated set of tows 238 are wound around a drum 132 to form a prepreg 204.

Figure 5:
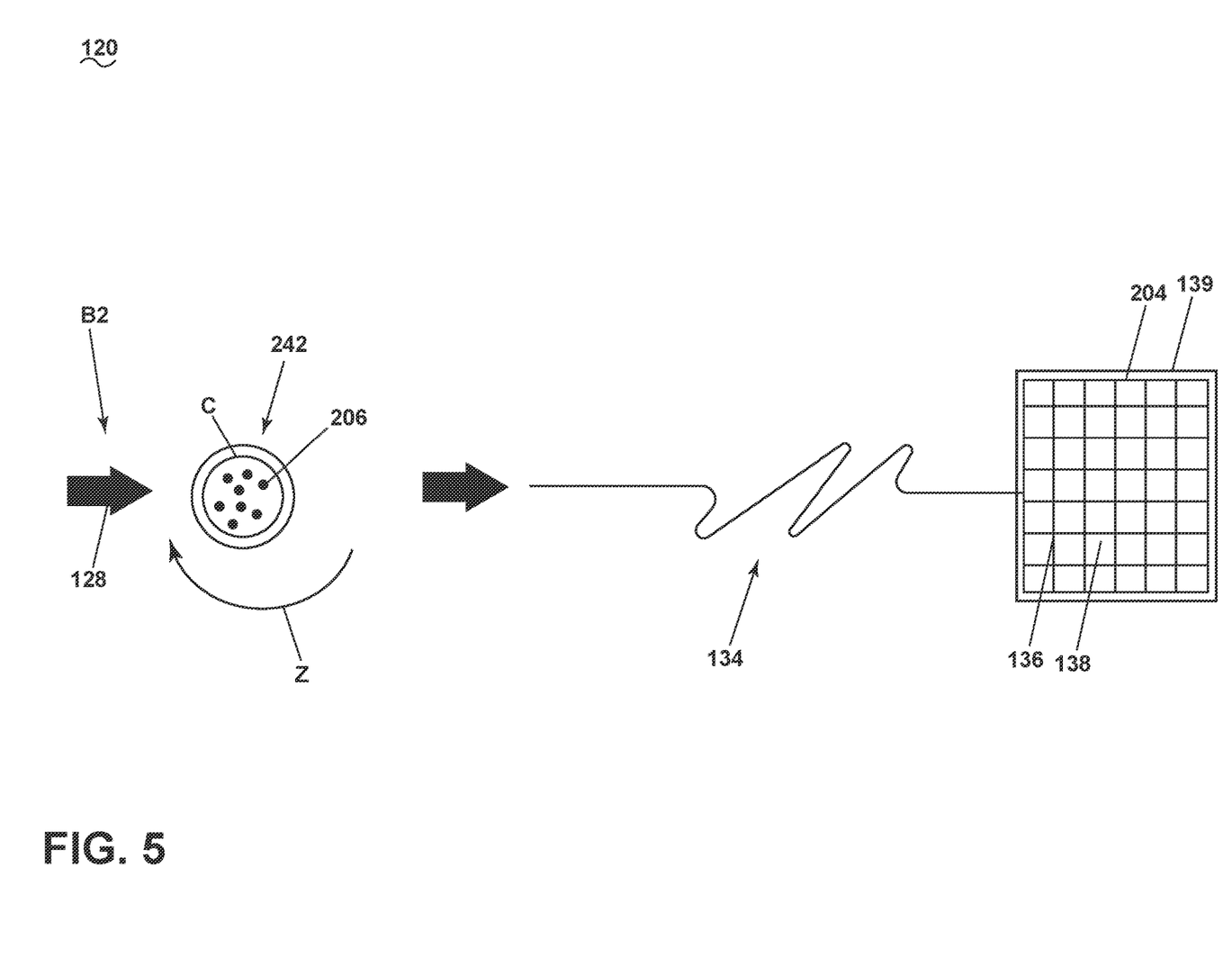
FIG. 5 is a schematic illustration of another optional third step for the process from FIG. 2.

FIG. 5 illustrates a third optional step (denoted "B2" in FIG. 2) for forming the twisted tow 242 from the process 120 described herein. The process 120 can continue from corresponding arrow 128 illustrated in FIG. 2 and FIG. 5. The tow 108 is twisted to form the twisted tow 242. The twisted tow 242 can also undergo a right-hand twist, or regular twist, so known as a "Z" twist (denoted "Z"). The twisted tow 242 is then woven 134. The woven twisted tow 242 can form a woven matrix 136. Resin transfer molding (RTM) can be used to form the prepreg 204. The woven matrix 136 can be placed in a mold 139 of ceramic matrix slurry 138 to form the prepreg 204.

The twisted tows 242, 242u described herein can be twisted between 1 turn/meter and up to and including 20 turns/meter during the first, second, or third optional part of the process 120. It is further contemplated that the twisted tows 242, 242u can be twisted between and including 5 turns/meter and up to and including 10 turns/meter. The turns/meter occur about an axis defined by the direction, for example either the first or second directions 124, 125, along which the fibers 206 extend.

FIG. 6 is a schematic cross-sectional view of a component 200 according to an aspect of the disclosure herein. The component 200 is similar to the component 100; therefore, like parts will be identified with like numerals increased by 100, with it being understood that the description of the like parts of the component 100 applies to the component 200, except where noted.

The component 200 is made of a CMC material where a ceramic matrix 210 encases a set of tows 212 to form the ply 202. At least one tow 208 of the set of tows 212 is the twisted tow 242 described herein. Multiple plies 202 can be stacked and debulked to form a laminate preform 214. A top of the component can define a laminar plane P extending into and out of the page. Each stacked ply 202 meets a consecutive ply along first, second, and third planes (denoted "P1", "P2", and "P3" respectively) each parallel to laminar plane P. The planes P1, P2, P3 can define intralaminar spaces between consecutive stacked plies 202. A plurality of fibers 206 defines at least one tow 208 in the set of tows 212. It is further contemplated that all of the tows 208 in the set of tows 212 are twisted tows 242. The set of tows 212 can also be the impregnated set of tows 238.

A middle ply 202m abuts both the first and second planes P1, P2 extending therebetween to define a thickness (denoted "T"). The twisted tow 242 can be located in the middle ply 202m. The plurality of fibers 206 defining the twisted tow 242 can include at least one bridging fiber 240. The at least one bridging fiber 240 can include a first portion 240a, a second portion 240b, and a third portion 240c. The first portion 240a can extend in a direction parallel to and along the first plane P1. The second portion 240b can extend in a direction parallel to and along the second plane P2. The third portion 240c can extend between the first and second portions 240a, 240b across the middle ply 202m from the first plane P1 toward the second plane P2. The third portion 240c can bend away from the first and second portions 240a, 240b at a fiber angle θ relative to the first and second planes P1, P2 respectfully. The third portion 240c can have a length (denoted "L"). It should be understood that the fiber angle θ, thickness T, and length L are all related to each other by the expression: (sin θ=T/L). For example a bridging angle of 10° for a ply with a thickness of 0.30 mm would have a length of 1.72 mm.

Twisting the tows 208 described herein increases the presence of bridging fibers 240. Too many turns can cause impregnation and spreading issues, while too few turns can decrease the intralaminar toughness for the ply. It was found that between 1 and 20 turns/meter resulted in an increased intralaminar toughness for the ply 202. A balance between a full impregnation with increased intralaminar toughness was found at and between 5 turns/meter and up to 10 turns/meter. A process including between 2 and 7 turns/meter provides sufficient impregnation with increased intralaminar toughness when compared to a process utilizing zero twists/meter.

Figure 7:
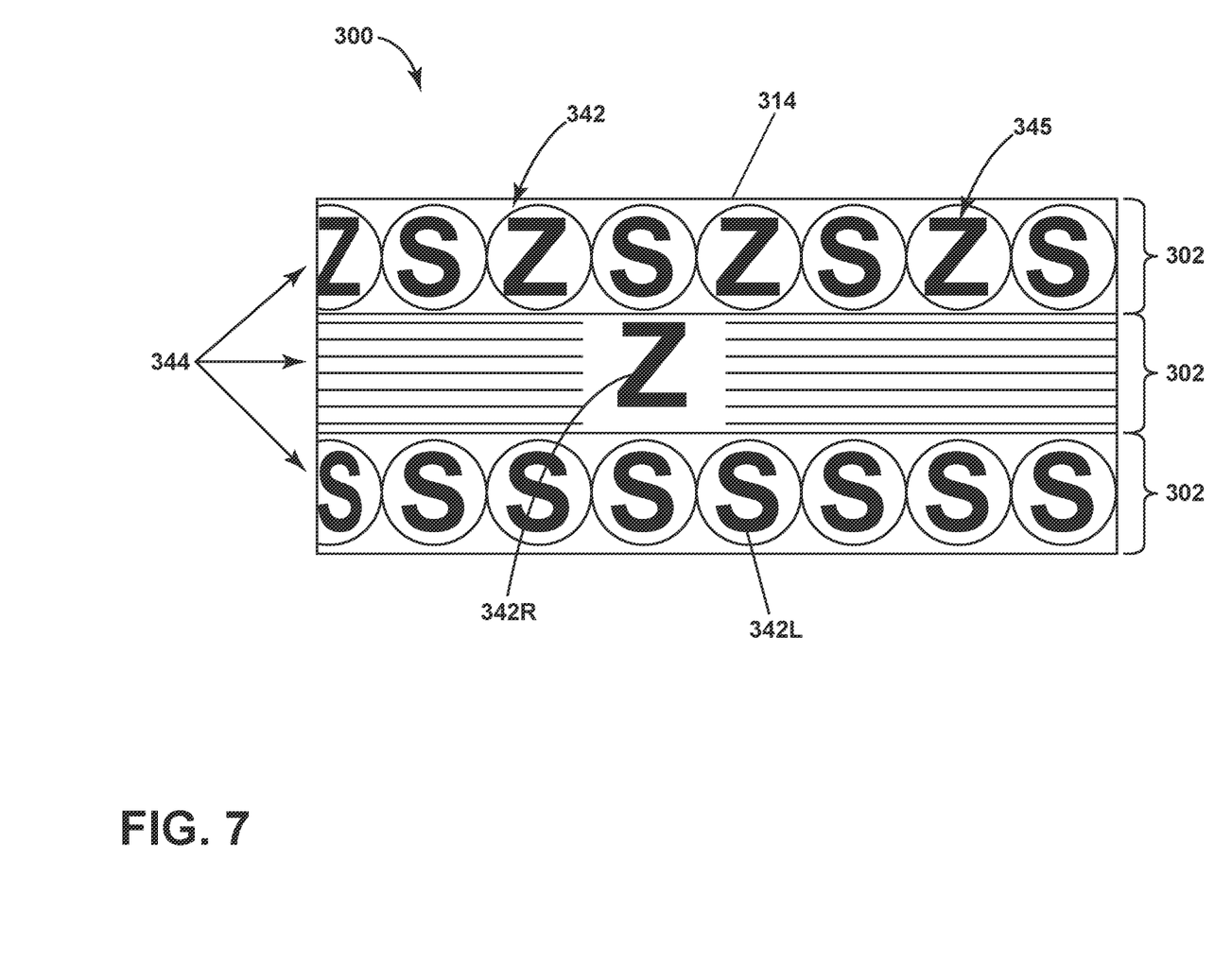
FIG. 7 is a schematic cross-sectional view of a variation of the component from FIG. 6 according to another aspect of the disclosure herein.

FIG. 7 illustrates a component 300 according to an aspect of the disclosure herein. The component 300 is similar to the component 200; therefore, like parts will be identified with like numerals increased by 100, with it being understood that the description of the like parts of the component 200 applies to the component 300, except where noted.

The component 300 is defined by multiple plies 302 stacked and debulked to form a laminate preform 314. Each ply 302 can define an individual row 344 of twisted tows 342. Each individual row 344 can have a pattern 345 of left-hand twisted tows 342L or right-hand twisted tows 342R, or both left-hand twisted tows 342L and right-hand twisted tows 342R. The pattern 345 can include various twisted tows 342 or many of the same twisted tows 342. Further, every other row 344 can have at least one row of left-hand twisted tows 342L and at least one row of right-hand twisted tows 342R.

Figure 8:
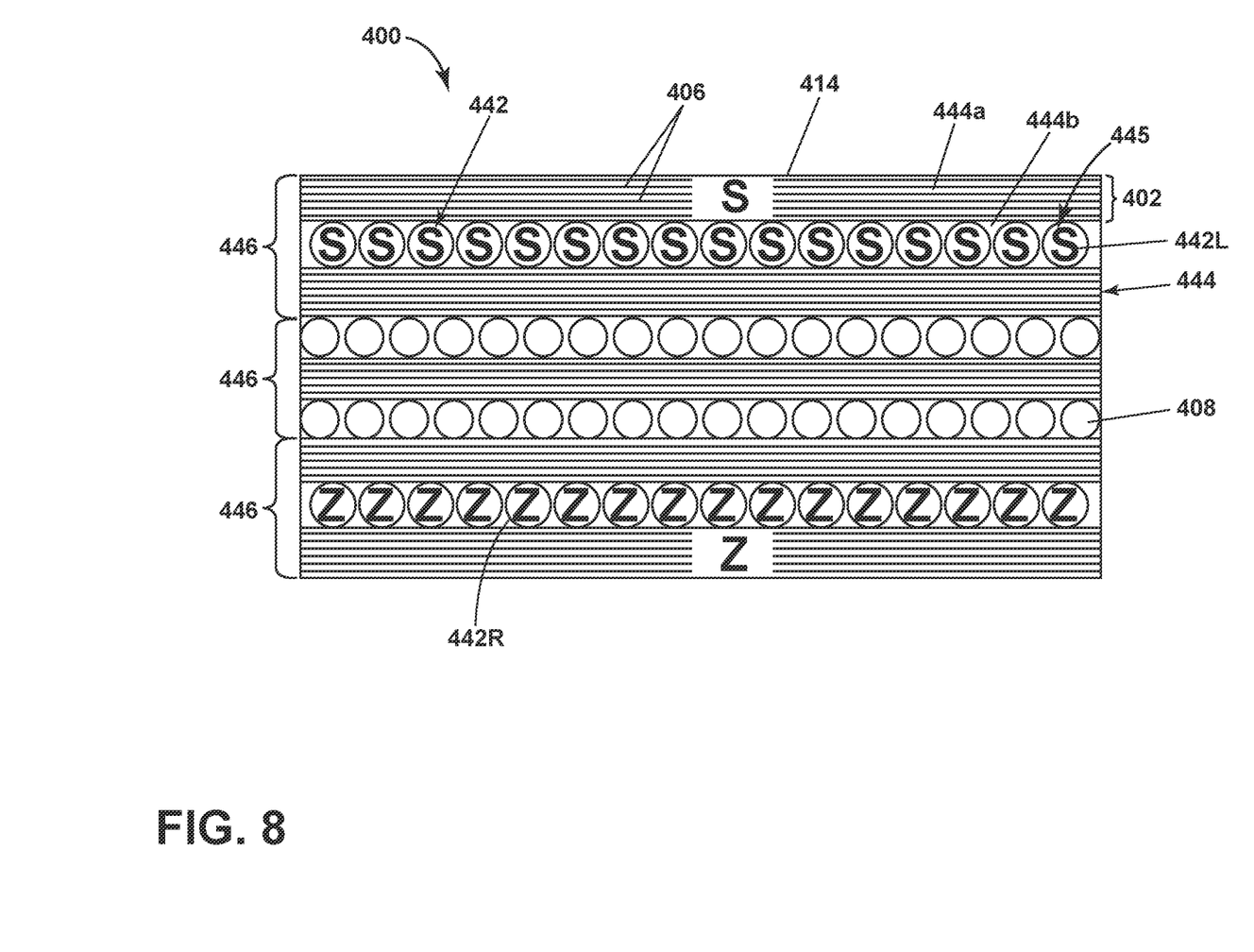
FIG. 8 is a schematic cross-sectional view of a variation of the component from FIG. 6 according to yet another aspect of the disclosure herein.

FIG. 8 illustrates a component 400 according to an aspect of the disclosure herein. The component 400 is similar to the component 300; therefore, like parts will be identified with like numerals increased by 100, with it being understood that the description of the like parts of the component 300 applies to the component 400, except where noted.

The component 400 is defined by multiple plies 402 stacked and debulked to form a laminate preform 414. Each ply 402 can define an individual row 444 of tows 408. Each individual row 444 can have a pattern 445 of left-hand twisted tows 442L or right-hand twisted tows 442R, or both left-hand twisted tows 442L and right-hand twisted tows 442R. The pattern 445 can include various twisted tows 442 or many of the same twisted tows 442. A set of rows 446 can include at least one row with the pattern 445. Every other set of rows 446 can include the pattern 445. It is further contemplated that each set of rows 446 includes multiple rows 444 of the pattern 445 with left-hand twisted tows 442L or multiple rows of the pattern 445 with right-hand twisted tows 442R. By way of non-limiting example, one set of rows 446 can have consecutive plies 402 formed with left-handed twisted tows 442L where a plurality of fibers 406 in a first row 444a are oriented at an angle with respect to an abutting second row 444b.

It should be understood that any combination of patterns of tows and twisted tows defining the laminate preforms described herein is contemplated where at least one row includes a twisted tow.

Figure 9:
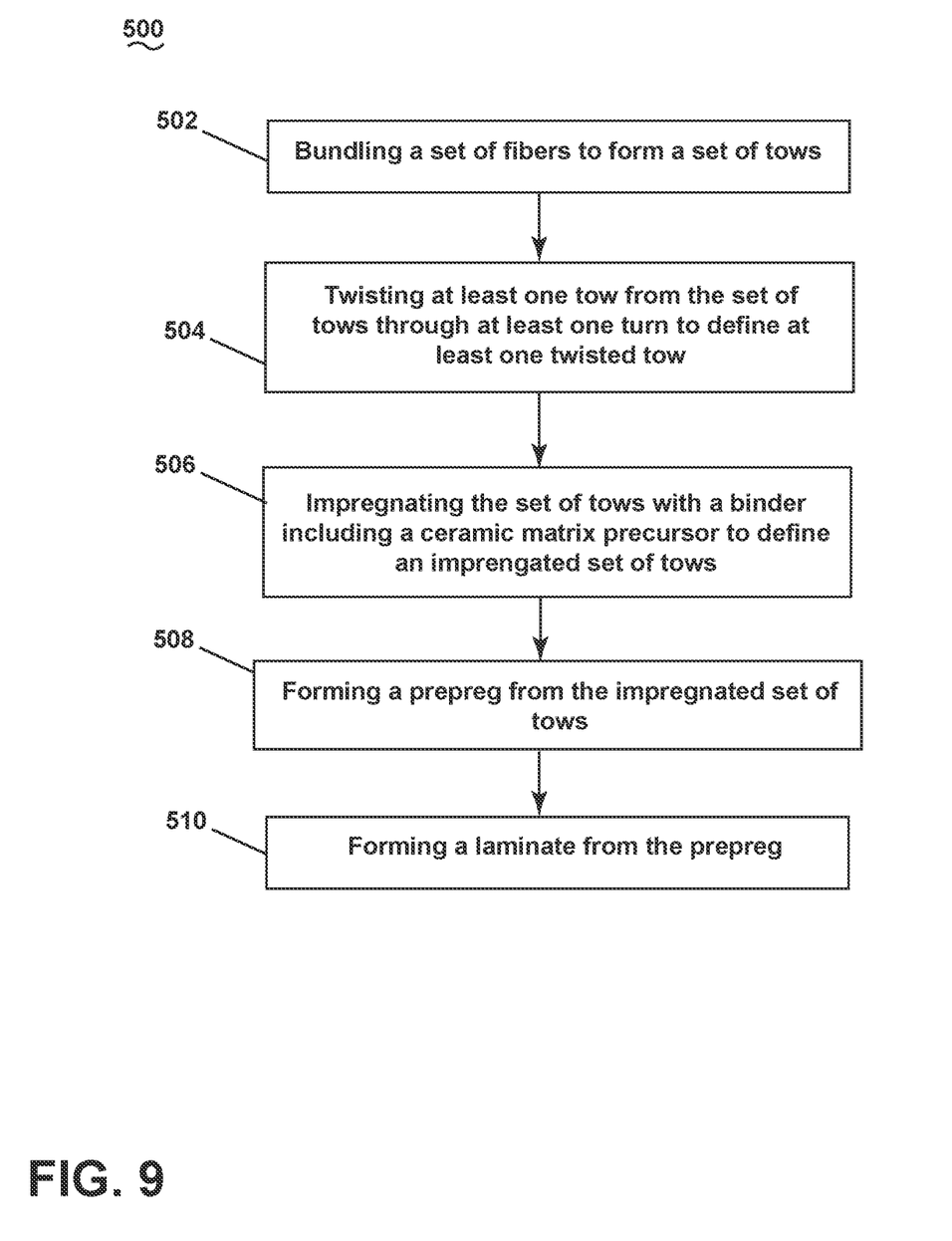
FIG. 9 is a flow chart illustrating a method of processing ceramic fiber for the manufacture of a ceramic matrix composite component.

FIG. 9 is a flow chart illustrating a method 500 of processing ceramic fiber, by way of non-limiting example the plurality of fibers 206, for the manufacture of a ceramic matrix composite component, by way of non-limiting example the component 200. The method includes at block 502 bundling the plurality of fibers 206 to form the set of tows 212. At block 504, the method includes twisting at least one tow 208 from the set of tows 212 through at least one turn/meter to define at least one twisted tow 242. The twisted tow 242 can be twisted between 1 and up to and including 20 turns/meter. It is further contemplated that the twisted tow 242 is twisted between and including 5 turns/meter and up to and including 10 turns/meter. At block 506, the method includes impregnating the set of tows 212 with a binder including the ceramic matrix precursor 138 to define an impregnated set of tows 238. At block 508, the method includes forming the prepreg 204 from the impregnated set of tows 238 and at block 510, the method includes forming the ply 202 from the prepreg 204.

The method 500 can include impregnating multiple sets of tows 208, each set of tows 208 including at least one twisted tow 242, to define a plurality of prepregs 204, forming multiple plies 202 from the plurality of prepregs 204, and stacking the multiple plies 202 to define the laminate preform 214.

The method 500 can further include forming rows 344 of left-hand twisted tows 442L or right-hand twisted tows 442R. The set of rows 446 described herein can be multiple rows of left-hand twisted tows 442L or right-hand twisted tows. It is further contemplated that every other row 344 is a right-hand twisted tow 442R and a left-hand twisted tow 442L.

The method 500 can include any of the optional steps A, B, C described herein with respect to FIGS. 2-5. It is also contemplated that the method 500 includes a combination or parts of the optional steps A, B, C described herein with respect to FIGS. 2-5.

Benefits to the disclosure include stronger bridging with an increase in the number of bridging fibers in the ply. The greater the fiber angle the better the chance of a particular fiber participating in bridging between layers. Intentionally forming bridging fibers reinforces the through thickness "T". An improved intralaminar toughness due to slightly misaligned fibers relative to the in-plane direction increases intralaminar resistance. Intentionally misaligning fibers in order to achieve more robust fiber angle bridging enables a higher intralaminar toughness. Twisting the tow enables this intentional misalignment.

An additional benefit of the present disclosure relates to the handling and manufacturability of a CMC tow. As the tow is transported in both batch and continuous processes, separated filaments, sometimes referred to as "fuzz", can cause difficulty for both operators and equipment. Twisting the tow at the previously discussed stages of processing binds the individual filaments into a tighter, more consistent bundle. This improvement to the tow increases control over the size of the tow and the manner in which the tow deforms as the prepreg tape is formed. The twisted tow will also possess increased resistance to individual filaments separating from the bundle.

It should be appreciated that application of the disclosed design is not limited to turbine engines with fan and booster sections, but is applicable to turbojets and turbo engines as well.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A method of processing ceramic fiber for manufacturing of a ceramic matrix composite (CMC) component, comprising bundling a plurality of fibers to form at least one tow; twisting the at least one tow through at least one turn/meter to define at least one twisted tow; forming a set of tows including the at least one twisted tow; impregnating the set of tows with a binder including a ceramic matrix precursor to form an impregnated set of tows; forming a prepreg from the impregnated set of tows; and forming a laminate preform from the prepreg.

The method of any preceding claim wherein twisting the at least one tow comprises twisting the at least one tow between 1 turn/meter and up to and including 20 turns/meter.

The method of any preceding claim wherein twisting the at least one tow comprises twisting the at least one tow between and including 5 turns/meter and up to and including 10 turns/meter.

The method of any preceding claim wherein twisting the at least one tow comprises twisting the at least one tow between and including 2 turns/meter and up to and including 7 turns/meter.

The method of any preceding claim further comprising impregnating multiple sets of tows, each set of tows including at least one twisted tow, to form a plurality of prepregs, forming multiple plies from the plurality of prepregs, and stacking the multiple plies to form the laminate preform.

The method of any preceding claim wherein each ply comprises a row of twisted tows, and the row of twisted tows is formed with a pattern consisting of at least one of left-hand twisted tows, and right-hand twisted tows.

The method of any preceding claim wherein the pattern includes left-hand twisted tows and right-hand twisted tows.

The method of any preceding claim wherein every other tow is a left-hand twisted tow.

The method of any preceding claim wherein every other tow is a right-hand twisted tow.

The method of any preceding claim wherein multiple rows define a set of rows and every other set of rows includes the pattern.

The method of any preceding claim wherein forming the prepreg comprises wrapping the impregnated set of tows around a drum.

The method of any preceding claim further comprising depositing a coating on the plurality of fibers via a chemical vapor deposition (CVD) process to form a coated plurality of fibers prior to bundling the plurality of fibers.

The method of any preceding claim wherein impregnating the at least one twisted tow with a binder comprises impregnating the at least one twisted tow with a matrix slurry.

The method of any preceding claim further comprising depositing a coating on the plurality of fibers via a chemical vapor deposition (CVD) process to form a coated plurality of fibers after twisting the at least one tow.

The method of any preceding claim wherein impregnating the at least one twisted tow with a binder comprises impregnating the at least one twisted tow with a matrix slurry.

The method of any preceding claim wherein forming the prepreg comprises weaving or braiding the set of tows prior to impregnating the set of tows.

The method of any preceding claim further comprising depositing a coating on the plurality of fibers via a chemical vapor deposition (CVD) process to form a coated plurality of fibers prior to bundling the plurality of fibers.

A laminate preform for a ceramic matrix composite (CMC) component, the laminate preform comprising at least one ply including a prepreg formed with an impregnated set of tows, at least one tow in the impregnated set of tows twisted through at least one turn/meter, and having at least one bridging fiber extending between adjacent plies.

The laminate preform of any preceding claim wherein the at least one ply comprises multiple plies stacked to define the laminate preform.

The laminate preform of any preceding claim wherein at least one tow in the impregnated set of tows is twisted between 1 turn/meter and up to and including 20 turns/meter.

The laminate preform of any preceding claim wherein at least one tow in the impregnated set of tows is twisted between 5 turns/meter and up to and including 10 turns/meter.

The laminate preform of any preceding claim wherein at least one tow in the impregnated set of tows is twisted between 2 turns/meter and up to and including 7 turns/meter.

The laminate preform of any preceding claim wherein at least one tow in every other ply in the multiple plies includes a pattern with one of a left handed twisted tow and a right handed twisted tow.

The laminate preform of any preceding claim wherein the at least one tow is every tow in the impregnated set of tows.

What is claimed is:

1. A laminate preform for a ceramic matrix composite (CMC) component, the laminate preform comprising at least one ply including a prepreg formed with an impregnated set of tows, at least one tow in the impregnated set of tows twisted through at least one turn/meter, and having at least one bridging fiber extending between adjacent plies.

2. The laminate preform of claim 1, wherein the at least one ply comprises multiple plies stacked to define the laminate preform.

3. The laminate preform of claim 2, wherein the at least one tow in the impregnated set of tows is twisted between 1 turn/meter and up to and including 20 turns/meter.

4. The laminate preform of claim 3, wherein the at least one tow in the impregnated set of tows is twisted between 5 turns/meter and up to and including 10 turns/meter.

5. The laminate preform of claim 2, wherein at least one tow in every other ply in the multiple plies includes a pattern with one of a left handed twisted tow and a right handed twisted tow.

6. The laminate preform of claim 2, wherein the at least one tow is every tow in the impregnated set of tows.

7. The laminate perform of claim 1, wherein the impregnated set of tows at least one twisted tow.

8. The laminate preform of claim 7, wherein each set of tows include at least one twisted tow to form a plurality of prepregs.

9. The laminate perform of claim 8, further comprising multiple plies formed by the plurality of prepregs, the multiple plies being stacked to form the laminate preform.

10. The laminate preform of claim 9, wherein each ply comprises a row of twisted tows, and the row of twisted tows is formed with a pattern consisting of at least one of left-hand twisted tows, and right-hand twisted tows.

11. The laminate preform of claim 10, wherein the pattern includes left-hand twisted tows and right-hand twisted tows.

12. The laminate preform of claim 10, wherein multiple rows define a set of rows and every other set of rows includes the pattern.

13. The laminate preform of claim 1, wherein the impregnated set of tows are wrapped around a drum.

14. The laminate preform of claim 13, wherein the impregnated set of tows are formed by a plurality of fibers that are bundled together.

15. The laminate preform of claim 14, further comprising a coating deposited on the plurality of fibers via a chemical vapor deposition (CVD) process to form a coated plurality of fibers prior to bundling the plurality of fibers.

16. The laminate preform of claim 1, wherein the impregnated set of tows include a binder including a ceramic matrix precursor.

17. The laminate preform of claim 16, wherein the impregnated set of tows at least one twisted tow, and the at least one twisted tow is impregnated with a binder being a matrix slurry.

18. The laminate preform of claim 1, wherein the impregnated set of tows are formed by a set of tows that are woven or braided prior to impregnating the impregnated set of tows.

19. The laminate preform of claim 1, wherein the impregnated set of tows are formed by a plurality of fibers that are bundled together, and wherein the impregnated set of tows are formed by a plurality of fibers that are bundled together further comprising depositing a coating on the plurality of fibers via a chemical vapor deposition (CVD) process to form a coated plurality of fibers prior to bundling the plurality of fibers.

20. The laminate preform of claim 1, wherein the laminate perform is used within a turbine engine.

\* \* \* \* \*